(12) United States Patent
Carro

(10) Patent No.: US 7,412,039 B2
(45) Date of Patent: Aug. 12, 2008

(54) METHOD AND SYSTEM FOR VERIFYING AN ATTACHMENT FILE WITHIN AN E-MAIL

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 11/109,321

(22) Filed: Apr. 19, 2005

(65) Prior Publication Data

US 2005/0238147 A1    Oct. 27, 2005

(30) Foreign Application Priority Data

Apr. 23, 2004    (EP) .................... 04368034

(51) Int. Cl.
*H04M 11/06*    (2006.01)
(52) U.S. Cl. .................. 379/88.13; 709/206; 713/176
(58) Field of Classification Search .......... 379/88.13; 709/206; 713/176
See application file for complete search history.

(56) References Cited

U.S. PATENT DOCUMENTS 6,990,514 B1 *   1/2006   Dodrill et al. ............... 709/206

* cited by examiner

*Primary Examiner*—Gerald Gauthier
(74) *Attorney, Agent, or Firm*—Schmeiser, Olsen & Watts; Arthur J. Samodovitz

(57) ABSTRACT

System and method for managing a file attached to an e-mail. Added to a file name of the attached file is an address or derivation of the address from which a voice message associated with the attached file can be accessed. The file name with the address is displayed in the e-mail adjacent to an icon for the attached file. The derivation of the address is formed by identifying character(s) in the address or syntax of the address which are incompatible with file naming rules of a computer to receive the file and replacing the incompatible character(s) or syntax with corresponding character(s) or syntax which are compatible with file naming rules of the computer to receive the file. The address or derivation of the address can be merged with the file name. The voice message can describe a content of the file.

2 Claims, 2 Drawing Sheets

---

L_Carroll@ibm.com
02/09/2003 18:33

To: jfriday76@yahoo.com
cc:
Subject: Le Duc de Berry

*160*

John:
    The "Tres Riches Heures du Duc de Berry" is usually referred to as "le roi des manuscrits enlumines" or "the kind of the illuminated manuscripts", but it is also a pinnacle in the entire history of painting.

This was a collection of the text for each liturgical hour of the day - hence the name - which often included other, supplementary, texts. Calendars, prayers, psalms and masses for certain holy days were commonly included. Commissioned by Jean, Duc de Berry in 1413, it was painted by the Limbourg brothers who left it unfinished at their (and the Duc's) death in 1416. The Duc Charles I de Savoie commissioned Jean Colombe to complete the painting of the manuscript between 1485-1489.
I attach here a sample of the calendar paintings.

—*170*    *165*

Berry-January (http..((www.messagebay.com(messages(987654321.wav).jpg
Best regards,
Lewis Carroll

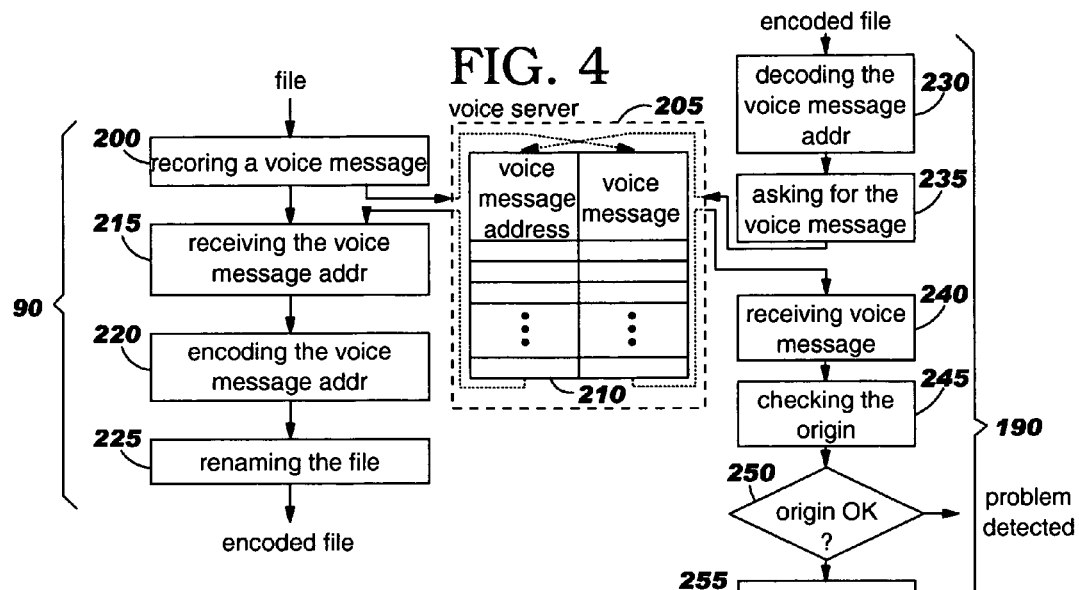
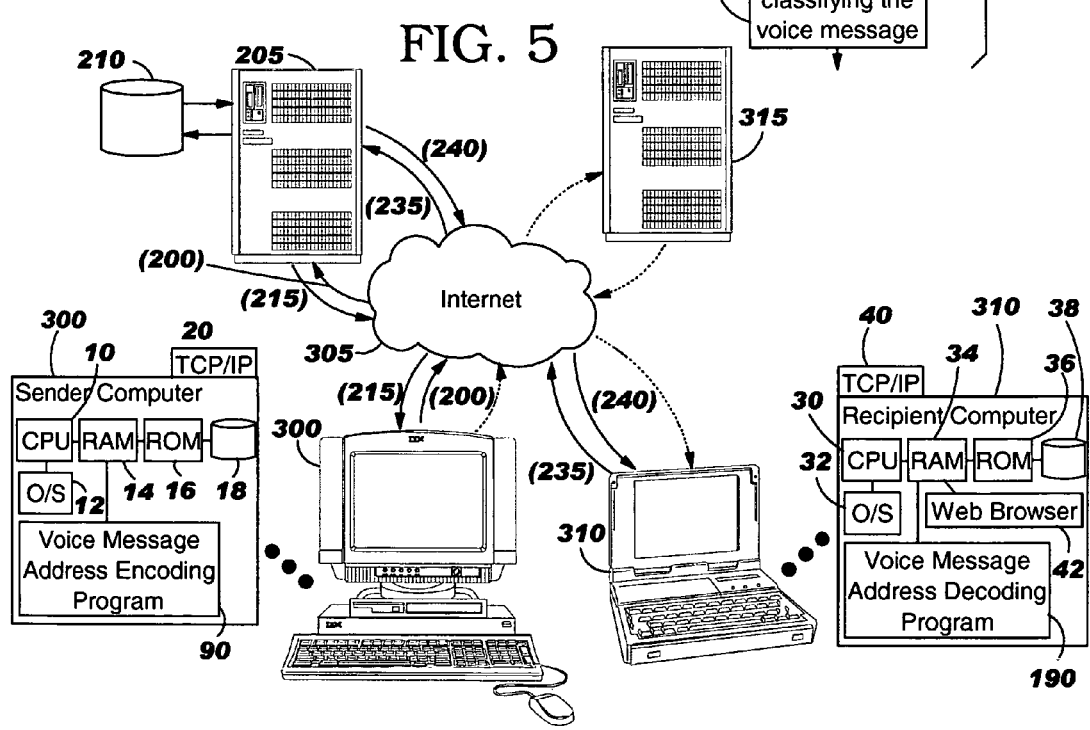

METHOD AND SYSTEM FOR VERIFYING AN ATTACHMENT FILE WITHIN AN E-MAIL

BACKGROUND OF THE INVENTION

The present invention relates generally to e-mail, and more specifically to a technique to verify authenticity of a file attached to an e-mail.

Electronic mail or "e-mail" is well known today. It is typically sent over the Internet, and received and displayed by a recipient's web browser. An e-mail may also include a file attachment. The file attachment is typically displayed as an icon with a name of file adjacent to the icon. If a recipient "clicks on" or otherwise selects the file icon, the recipient's web browser will fetch and open the file.

Many e-mails are unwanted "spam", i.e. unsolicited advertisements or messages. The spam e-mail may also include attachment files. The attachment file may contain unwanted or offensive text documents, graphics, pictures, audio, or video information.

A computer virus can also be embedded in a file attached to an e-mail. This is the most common method to "infect" the recipient's computer and other computers across a network. For example, a recipient may receive an e-mail with an attached, infected file including a computer program that can be executed within the recipient's computer system. When an infected file is opened, the computer program executes and may disrupt or incapacitate the recipient's computer by corrupting or deleting important programs and/or data files. While less prevalent in number than "spam", viruses are more disruptive and costly.

A computer virus, when executed at a recipient computer, may also access information contained in the recipient's address book. Then, the virus may mail a copy of itself as a file attached to an e-mail sent by the recipient, to everyone in the recipient's address book. In such a case, the infected file attachment may appear to originate from someone the (new) recipient knows and trusts. Because such files "apparently come" from a reliable source, the likelihood the infection will be spread by unwitting recipients is greatly increased. In those cases, the recipient may wish to ensure that attached or accessed files have been sent by a trustworthy sender rather than by a hacker, prior to exposing his or her computer system to an infected program file.

Known e-mail systems e.g., U.S. Pat. No. 6,553,341 entitled "Method and apparatus for announcing receipt of an electronic message", provide the capability to automatically read selected portions of an e-mail by using text-to-speech conversion.

An object of the invention is to provide to a recipient information describing content of a received file attachment, before the recipient opens and accesses the received file.

Another object of the invention is to enable a recipient to verify that a received file has been intentionally sent by a person and not automatically sent by a machine, before the recipient opens and accesses the received file.

Another object of the invention is to enable a recipient to verify the identity of the sender or the author of the received file, before the recipient opens the file.

SUMMARY

The present invention resides in a system, method and program product for managing a file attached to an e-mail. Added to a file name of the attached file is an address or derivation of the address from which a voice message associated with the attached file can be accessed. The file name with the address are displayed in the e-mail adjacent to an icon for the attached file.

In accordance with features of the present invention, the address or derivation of the address can be merged with the file name. This merger can result from inserting the address in front of an extension dot of the file name. The derivation of the address may differ syntactically from the address from which the message can be accessed.

In accordance with another feature of the present invention, the voice message can describe a content of the file.

In accordance with another feature of the present invention, a voice of the voice message can be compared to a voice signature to determine authenticity of the voice message.

BRIEF DESCRIPTION OF THE DRAWINGS

FIG. 4 is a flowchart of the program of FIG. 1 to rename a file attached to an e-mail to include an address of an associated voice message, and a program within the recipient's computer to fetch and play the voice message.

FIG. 5 illustrates a distributed computer system or computing environment in which the present invention can be implemented and used.

DETAILED DESCRIPTION OF THE PREFERRED EMBODIMENTS

According to the present invention, an address of an audio file that describes the content of a text, image or other type of file attached to an e-mail is merged with an original name of the attached file. The address of the audio file can be its URL or other address. The audio record can be used to learn the general subject or content of the attached file and verify the origin or author of the attached file before the attached file is opened. When merging the address of the audio file with the original name of the attached file, the address of the audio file may be modified in form to avoid syntax, characters or symbols that are forbidden by the nomenclature of the file system naming rules. For example, the symbol "\" is not permitted in the naming rules for files supported by the Microsoft Windows operating system. ("Windows" is a Trademark of Microsoft Corporation). The address of the audio file may also be modified to reduce its length when needed to comply with the file system naming rules. Addresses to be encoded may be of any forms e.g., local addresses, addresses in private networks or Internet addresses. However, for sake of illustration, the examples given in the following description are based on URL type of addresses. The address of the voice message can be merged with the original file name regardless of whether the file is a type to be transmitted from a server to a user device or a type to be locally saved or transmitted to another system.

Figure 1:
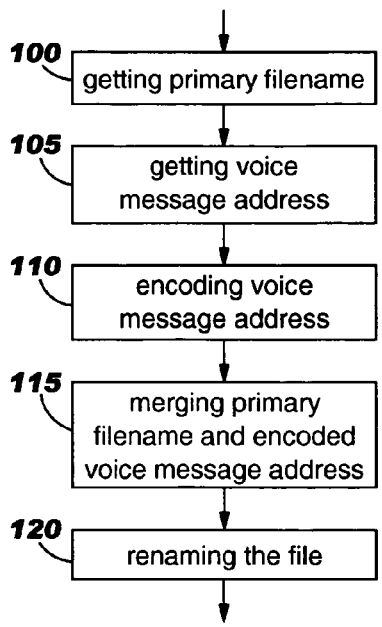
FIG. 1 is a flowchart of a program which renames a file attached to an e-mail, according to the present invention, to include an address of an associated voice message.
Figure 2:
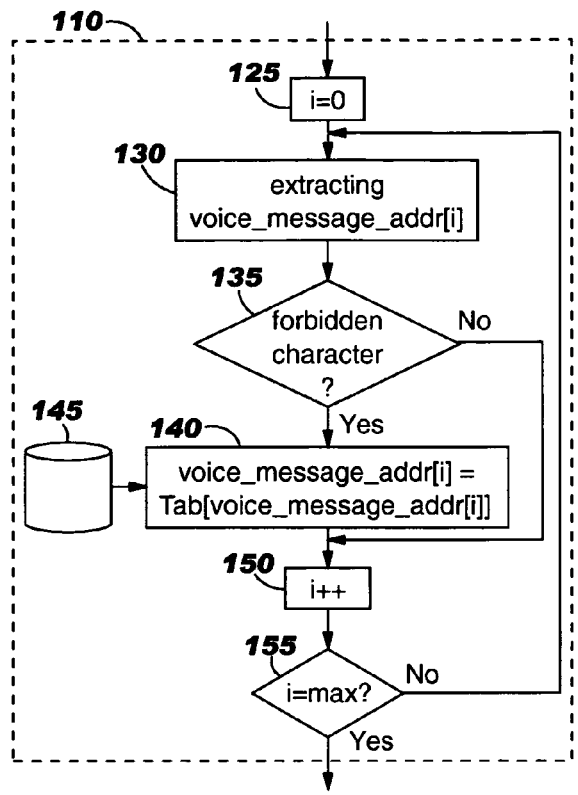
FIG. 2 is a flowchart which illustrates in more detail an encoding step 110 of the program of FIG. 1.

The present invention will now be described in detail with reference to the figures. FIGS. 1 and 2 illustrate a voice or audio message address encoding program 90 to merge an address of a voice message with an original name of a file 170 (described by the voice message). The file may be attached to an e-mail sent by a sender from a sender computer 300, and received by a mail server 315 via the Internet 305 en route to a recipient computer 310 via the Internet. The program 90 can reside in the sender computer 300 which includes a CPU 10, operating system 12, RAM 14, ROM 16, disk storage 18 and TCP/IP card 20 to interface the sender computer 300 to Internet 305, as illustrated in FIG. 5. A related voice or audio message address decoding program 190 can reside in the recipient computer 310 which includes a CPU 30, operating system 32, RAM 34, ROM 36, disk storage 38, web browser 42 and TCP/IP card 40 to interface the sender computer 300 to Internet 305, as illustrated in FIG. 5. As shown in FIG. 1, program 90 extracts or reads the original name of the file 170 selected by the user/sender for inclusion in the e-mail (step 100). Typically, the original or primary name indicates the general subject or title of the file, and possibly the author of the file (but not the address of the associated voice message). The user/sender can also record an audio message file and send it to the voice server 205 for storage. The voice server 205 will return to computer 300 the URL address of the audio message file associated with the file (step 105). The voice message provides a summary or description of the file and can also be used to verify the origin of the file. Then, program 90 encodes or modifies the voice message address, if needed to comply with file naming rules of the recipient computer (step 110), and merges the encoded or modified voice message address with the primary filename of the file, using predetermined separators (step 115). The "separators" can be parenthesis. Program 90 then renames the file, as it appears in the e-mail as an icon/attachment, with the merged primary filename and the encoded or modified voice message address (step 120).

FIG. 2 provides more detail of the foregoing modifying or encoding step 110. Program 90 sets a variable "i" to "zero" (step 125) and extracts the $i^{th}$ character from the voice message address string (step 130). Then, program 90 performs a test to determine whether the extracted character is valid or otherwise forbidden by file naming, for example, syntax, rules imposed by the file system of the recipient's computer (step 135). If the extracted character is a valid character under the file naming rules, variable "i" is incremented by one (step 150) and program 90 performs a test to determine if variable "i" has reached its maximum value that is, if all characters of the voice message address string have already been processed (step 155). If variable "i" has not yet reached its maximum value, program 90 repeats the last four steps of the algorithm (steps 130 to 150). Otherwise, if variable "i" has reached its maximum value, the process is stopped. If the character extracted from the voice message address string is forbidden by the file naming, for example, syntax, rules, program 90 selects a corresponding valid character, or group of characters, in a lexicography table 145. Then, program 90 replaces the invalid character with the corresponding, valid character, or group of characters (step 140). Then, program 90 increments variable "i" by one and performs the same test described above to determine if variable "i" has reached its maximum value.

As an example of use of program 90, consider the case of an image file attachment with original or primary name "Berry-January.jpg". In this example, the image file has JPEG format. (However, the present invention is useful with other types of files such as text files.) A sender would like to send this image file to a recipient as an e-mail attachment with the voice message address merged with the original or primary file name, with modification or encoding of the voice message address as needed to comply with the recipient's file naming rules. In this example, the lexicography table 145 modifies or encodes the voice message address as follows:

":" modified or encoded to ".."

"/" modified or encoded to "("

After the e-mail is received by the recipient, the recipient can obtain an audio summary or description of this file and/or verify the origin of this file, by playing the voice message corresponding to this file. For sake of illustration, the recipient can download the voice message from the following URL:

http://www.messagebay.com/messages/987654321.wav

When the originator of the document "Berry-January.jpg" saves or sends the document, an option such as "Copy path to file" can be selected to encode in the name of the document the URL (or other address) of the voice message. The voice message provides a summary or description of the file and/or verifies the origin of the file. If this option is selected, program 90 modifies the filename according to the algorithm of FIGS. 1 and 2. By using the lexicography table 145, program 90 modifies or encodes the voice message URL address as follows:

http..((www.messagebay.com(messages(987654321.wav

Then, program 90 merges the encoded URL with the original or primary filename. In this example, the encoded URL is enclosed by separators in the form of parenthesis. The encoded URL is inserted in front of the extension dot of the primary filename and before the ".jpg" as follows:

Berry-January(http..((www.messagebay.com(messages (987654321.w av).jpg

Then, program 90 renames the file in the e-mail to this modified filename.

However, it should be understood that the audio message address can be merged in other ways with the file name. For example, program 90 can alternately replace a sequence of forbidden characters by a single one, for example, replacing "//:" by "(". Also, program 90 may replace some sets of characters with more compact codes, for example, replacing "http://" by "H!".)

Figure 3:
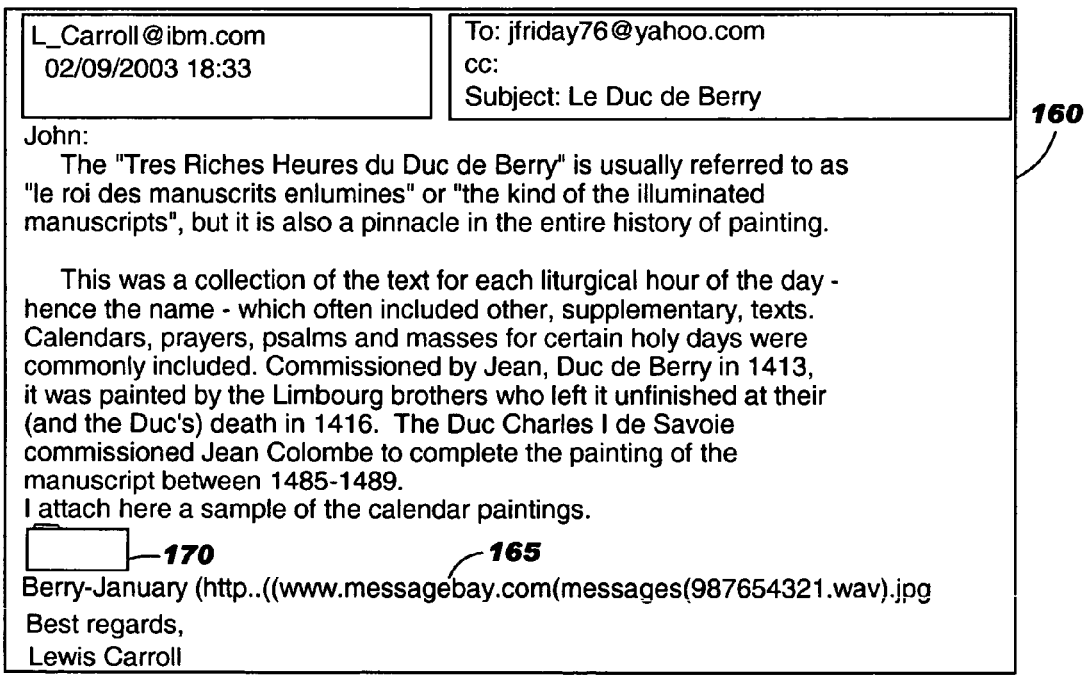
FIG. 3 illustrates an e-mail with an attachment named by the program of FIG. 1, according to the present invention.

FIG. 3 depicts an e-mail 160 where the original name of attachment file 170 is "Berry-January" and the syntax transformed URL 165 of the voice message address is "http..(www.messagebay.com(messages(987654321.wav). The composite filename includes the original file name merged with the URL 165 of the voice message address in parenthesis, according to the algorithm of FIG. 1.

After receipt of the e-mail 160 with the file attachment 170, the recipient can select to hear the voice message and thereby obtain a summary or a description of the attached file and/or verify the origin of the attached file. The recipient selects to hear the voice message by selecting an option presented by the recipient's audio message handling program 190. In such a case, the recipient's program 190 will extract the voice message address from the composite file name (i.e. original or primary file name merged with the modified or encoded voice message address). Then, the recipient's program 190 will request the recipient's web browser 42 to fetch the voice message from the specified address and upon receipt, play the voice message to the recipient. The recipient's program 190 uses the same table 145 of lexicographic transformations as the one used by the sender program 90 to extract the real voice message address or URL from the composite file name. To that end, certain symbols or groups of symbols of the modified or encoded URL are replaced by symbols or characters that are compatible with URL conventions on the Internet, to request the voice message from the real URL. Using the same example as before, the decoded voice message address is as follows:

http://www.messagebay.com/messages/987654321.wav

Steps 200, 215, 220 and 225 of FIG. 4 illustrate an example of the sender's program 90 encoding the voice message address in the filename of the corresponding, attached file. Steps 230, 235, 240, 245, 250, 255 and 260 of FIG. 4 illustrate an example of the recipient's program 190 and the recipient's web browser program 42 to subsequently extract the voice message address and fetch the voice message file via the Internet. The voice message summarizes or describes the attached file and/or verifies the origin of the attached file, respectively.

When a user at computer 300 saves a file, or if a voice message has not already been associated with a file that has already been saved, and the user wants to send the file attached to an e-mail, the user can invoke program 90 and record a voice message briefly describing the content of the file or characterising the file (step 200). Using program 90, the user/sender then sends the voice message (as an attachment to an e-mail) to a voice server 205 where it is stored as a file in a database 210 of the voice server in association with a URL. The URL which includes the address of voice server 205 and this voice message file. The voice server 205 returns to the program 90 of user/sender computer 300 the voice message address or URL associated with this voice message (step 215). Then, program 90 within the user/sender's computer 300 modifies or encodes this voice message address (step 220), merges it with the original or primary file name and renames the file attachment 170 with the composite file name according to the algorithm described by reference to FIGS. 1, 2 and 3 (step 225). Next, the user sends the e-mail with the renamed file attachment to the recipient via a mail server 315 (shown in FIG. 5).

After receiving an e-mail with the attachment file and the composite name that contains an encoded voice message address, upon request of the recipient to program 190 in computer 310, program 190 extracts and decodes the voice message address (step 230) as described above. Optionally, the recipient can set a parameter of the recipient program 190 to automatically request the voice message address extraction and decoding whenever a voice message address is contained in the file name of an attachment. Then, the program 190 directs the web browser 42 to send a request (including the voice message address) over the Internet to fetch the audio file at the voice message address (step 235). In the illustrated example, this request is sent to voice server 205 which returns the voice message file. After receiving the voice message file (step 240) (if optional steps 245 and 250 are not used), the user can check the content and origin of the file, before opening the file attachment, by listening to and analysing the received voice message (step 255) and then decide whether to open the file attachment (step 260).

The following is a description of optional steps 250 and 255. Voice analysis, based on voice prints, can also be incorporated into the present invention to verify the author (or originator) of the voice message. A voiceprint is a set of measurable characteristics of a human voice that uniquely identifies an individual. These characteristics are based on the physical configuration of a speaker's mouth and throat and can be expressed as a mathematical formula. A voiceprint applies to a vocal sample recorded for that purpose, the derived mathematical formula, and its graphical representation. Voiceprints are currently used in known voice authentication systems, or Voice ID systems, for user authentication.

Known voice ID is a type of user authentication that uses voiceprints and pattern recognition software to verify a speaker. An adaptation of biometrics, voice ID relies on the fact that vocal characteristics, like fingerprints and patterns of people's irises, are unique for each individual. The criteria on which a voice ID system bases decisions are created by the shape of the speaker's mouth and throat, rather than more variable conditions. Because of the relative permanence of the characteristics it measures, the technology is not easily fooled by an attempt to disguise a voice, and is not generally affected by changes that can make a voice sound quite different to the human ear, such as a bad cold or extreme emotion. During enrollment for a voice authentication system, a user's voice is recorded, creating what is called a voiceprint for comparison with samples taken for user identification. To foil attempts to fool the system with a prerecorded voice sample, people may be asked to read or repeat a list of words in random combinations. Voice ID systems have been used in a variety of known security-related applications. Voice authentication products are currently available from a number of vendors.

Known voice biometrics programs create a voice print of the user i.e., a template of the person's unique voice characteristics created when the user enrolls with the system. All subsequent attempts to identify the user require the user to speak, so that their live voice sample may be compared against the prerecorded template. For example, U.S. Pat. No. 6,529,871 by Kanevsky et al. issued to IBM Corporation, entitled "Apparatus and method for speaker verification, identification, classification employing non-acoustic and/or acoustic models and databases" describes such a system.

The known voice biometrics programs can be performed at the recipient's computer, an authentication server (not shown) or voice server 205 automatically or upon request by the recipient, to determine the authenticity of the fetched audio message. To be performed at the recipient's computer, the voice message stored in voice server 205 is associated with downloading parameters corresponding to a voice authentication function and voice print for the audio message file. Thus, when the recipient requests the audio message file from the voice server, the voice server will download not only the voice message file but also the voice authentication function and voice print to allow the recipient computer to perform the voice comparison. Alternately, when the recipient requests the audio message file from the voice server, the voice server will automatically perform the voice comparison, and notify the recipient of the outcome.

Thus, the received voice message can be analysed to extract voice characteristics. Then, the voice characteristics are compared to prerecorded voice characteristics of the assumed sender, stored on a secure server e.g., a server owned by an authentication authority. Thus, step 245 can be included in the verification process in which the voice biometrics program verifies the origin of the audio message file associated with the attached file before the recipient opens the attached file.

If step 245 is included in the verification process, and the voice biometrics program confirms the origin of the attachment file (decision 250, yes branch), then the recipient's program 190 instructs the web browser 42 to play the voice message for the recipient (step 255). Based on the content of the e-mail and voice message and voice print authentication of the voice message, if any, the recipient can decide whether to immediately discard the e-mail and file attachment, whether to open the file attachment or whether to retain the e-mail with the file attachment to open later.

FIG. 5 depicts an example of a distributed computing environment which includes the present invention. For sake of illustration, the main steps of programs 90 and 190 described in FIG. 4 are illustrated with flow diagram arrows in FIG. 5. (Programs 90 and 190 can be loaded into their respective computers 300 and 310 from a computer storage medium such as a magnetic disk, CD ROM, DVD, etc. or downloaded from the Internet via respective TCP/IP adapter cards 20 and 40.) As described above, a user/sender computer 300 is connected to a network 305 such as the Internet, allowing transmission of files as attachments to e-mails or separately. Preferably, a voice server 205 comprising a data base 210 is also connected to network 305 to store the voice messages associated with the transmitted files. When user 300 wants to transmit a file according to the present invention, the user records a voice message summarizing or describing the content of the file. The user then sends the voice message as a file to the voice server 205 and the voice server stores the voice message file and associates it with a URL or other address. The voice server 205 returns the address of the voice message file, and program 90 within the user computer 300 encodes the voice message address and merges it with the original or primary file name of this file according to the algorithms described above. When a recipient at computer 310 receives an e-mail or a message containing this attached file from the user/sender via network 305 and a mail server 315, as illustrated by dotted arrows, the recipient analyzes the filename of the received file to determine whether or not it contains an encoded voice message address. If it contains an encoded voice message address, the recipient requests the recipient computer 310 to extract and decode the voice message address from the composite file name and obtain the voice message stored in the database 210 of the voice server 205 via the network 305.

In another embodiment of the present invention, some characteristics of the sender or author of the attached file are stored in conjunction with the voice message. For example, an electronic address of the sender or the author of the attached file can be associated with the voice message, allowing the recipient to contact him or her if needed. Also, several links to associated documents can be associated with the voice message, allowing the receiver to get further information on the subject of the attachment file before opening it. Also, the voice message can be associated with a URL or the voice authentication function on the voice server. Alternately, the voice message can be associated with downloading parameters to allow the recipient to download a voice authentication function and voice print for the audio message file. The voice authentication function will check the authenticity/origin of the audio message file by comparing some characteristics of the voice message with prerecorded characteristics of the presumed sender or author of this document.

The invention claimed is:

1. A method for managing a file attached to an e-mail, said method comprising the steps of:
    adding to a file name of the attached file, an address or derivation of the address from which a voice message associated with said attached file can be accessed; and
    displaying in said e-mail adjacent to an icon for said attached file, said file name with said address, wherein said derivation of said address is formed by the steps of:
        identifying character(s) in said address or syntax of said address which are incompatible with file naming rules of a computer to receive said file; and
        replacing said incompatible character(s) or syntax with corresponding character(s) or syntax which are compatible with file naming rules of said computer to receive said file.

2. A system for managing a file attached to an e-mail, said system comprising:
    means for adding to a file name of the attached file, an address or derivation of the address from which a voice message associated with said attached file can be accessed;
    means for displaying in said e-mail adjacent to an icon for said attached file, said file name with said address; and
    means for forming said derivation of said address, wherein the forming means comprises:
        means for identifying character(s) in said address or syntax of said address which are incompatible with file naming rules of a computer to receive said file; and
        means for replacing said incompatible character(s) or syntax with corresponding character(s) or syntax which are compatible with file naming rules of said computer to receive said file.

* * * * *